United States Patent [19]

Older et al.

[11] Patent Number: 4,499,740
[45] Date of Patent: Feb. 19, 1985

[54] FREEZER

[75] Inventors: Geoffrey I. Older, Basingstoke; Leigh S. Webb, Winchester, both of England

[73] Assignee: Air Products and Chemicals, Inc., Allentown, Pa.

[21] Appl. No.: 546,678

[22] Filed: Oct. 28, 1983

[30] Foreign Application Priority Data

Oct. 29, 1982 [GB] United Kingdom ................ 8230972

[51] Int. Cl.³ ............................................. F25D 17/02
[52] U.S. Cl. ......................................... 62/374; 62/380
[58] Field of Search .................... 62/63, 374, 375, 380, 62/384

[56] References Cited

U.S. PATENT DOCUMENTS

| | | | |
|---|---|---|---|
| 3,250,086 | 5/1966 | Morris, Jr. | 62/375 |
| 3,304,732 | 2/1967 | Rubin | 62/380 |
| 3,395,549 | 8/1968 | Grimes | 62/375 |
| 3,413,818 | 12/1968 | Pelmulder | 62/380 |

FOREIGN PATENT DOCUMENTS 1088126 6/1965 United Kingdom .

*Primary Examiner*—Ronald C. Capossela
*Attorney, Agent, or Firm*—Geoffrey L. Chase; James C. Simmons; E. Eugene Innis

[57] ABSTRACT

A freezer for individually quick freezing foodstuffs such as shrimps, diced chicken and peas, comprises a cooling tunnel (2) for precooling the foodstuff, and a freezing tunnel (3) for freezing the precooled foodstuff. The precooled foodstuff enters the freezing tunnel (3) through a hopper (12) and falls into a bath of liquid nitrogen. A rotating ribbon auger (20) lifts the foodstuff out of the liquid nitrogen and carries it through an equalization section where it remains in contact with cold nitrogen vapor. The frozen foodstuff leaves the freezing tunnel (3) through outlet (14). The ribbon auger (20) is designed to remove the foodstuff rapidly out of the liquid nitrogen and carry it slowly through the remainder of the freezing tunnel (3)—the equalization section.

12 Claims, 4 Drawing Figures

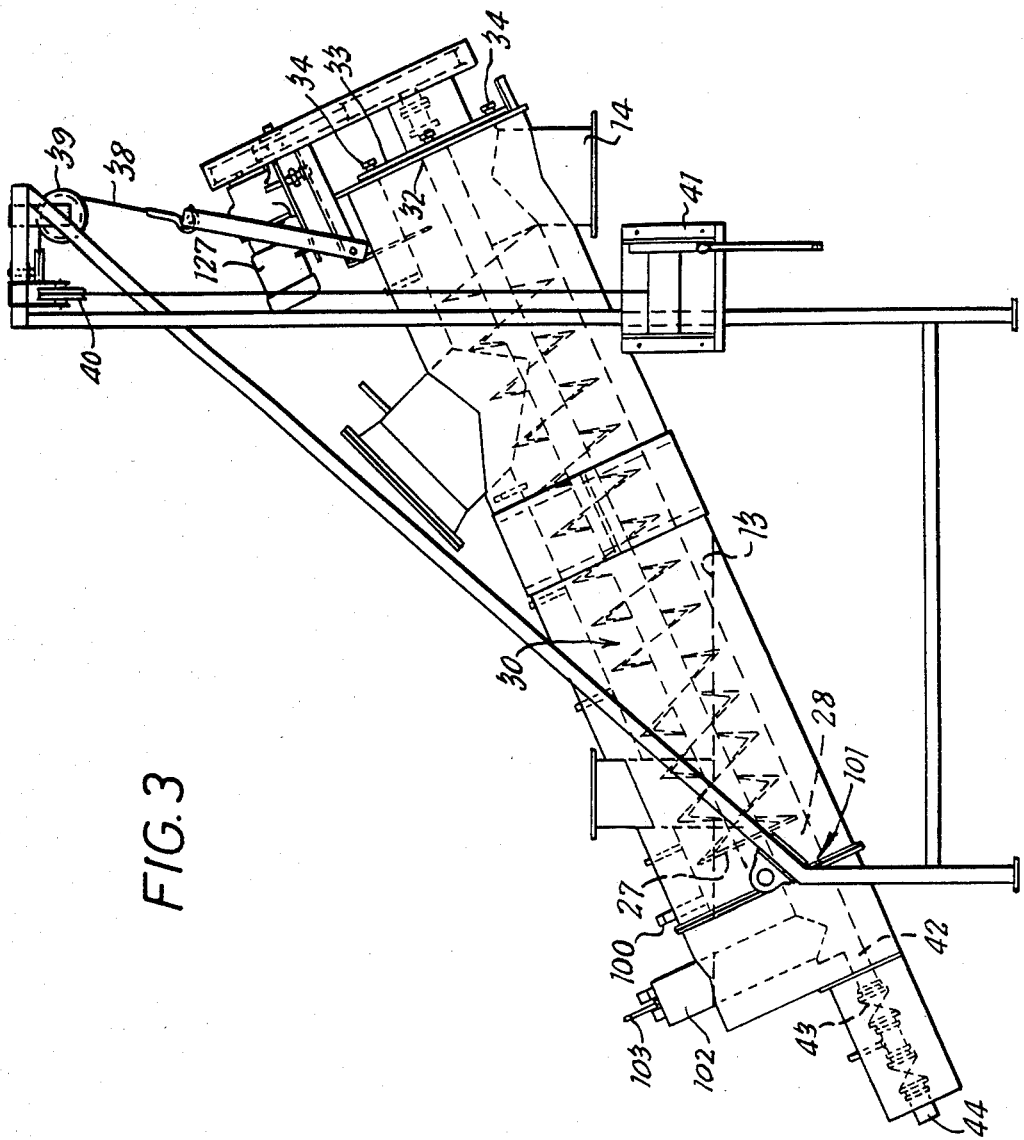

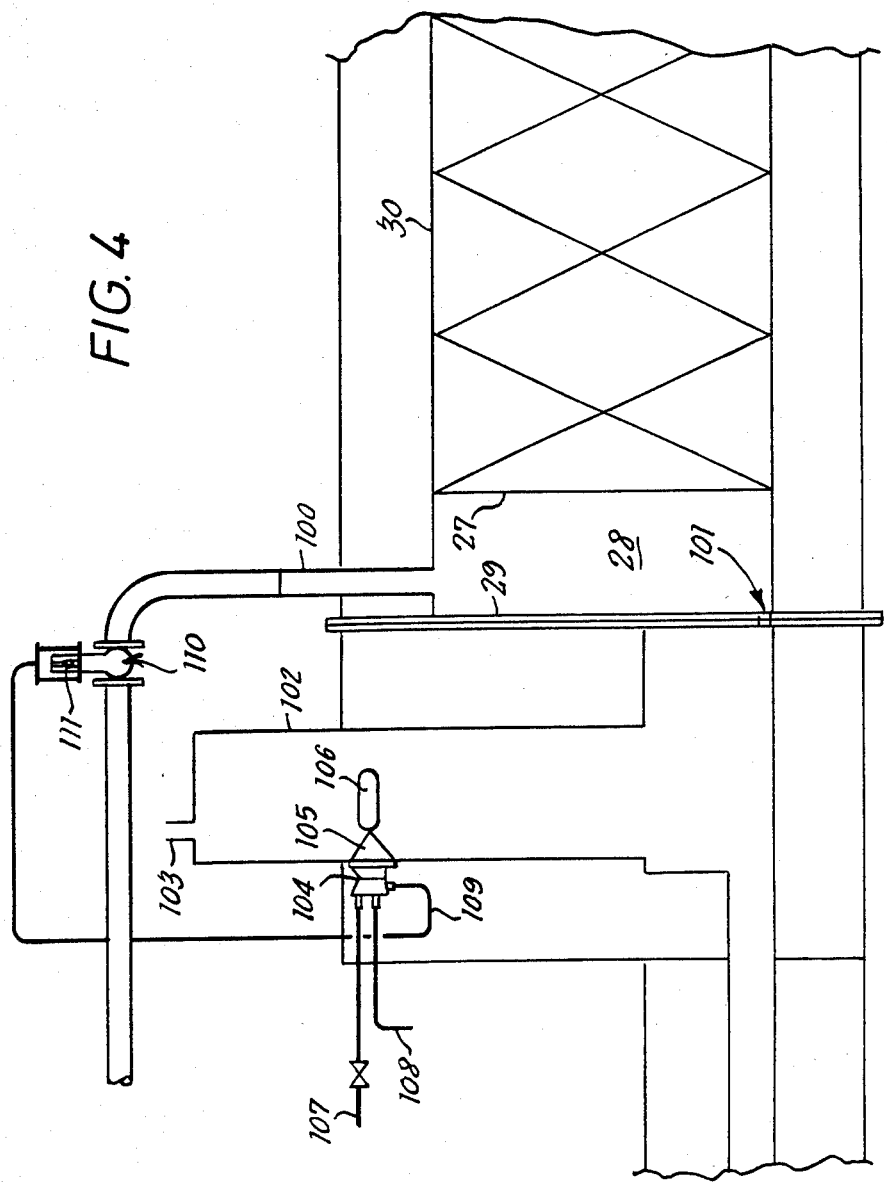

FREEZER

This invention relates to freezers and, more particularly but not exclusively, is concerned with freezers for foodstuffs and a freezing tunnel for use in such freezers.

Although it has long been possible to freeze such foodstuffs as diced chicken meat, shrimps and peas in trays in blast freezers the frozen product tends to agglomerate.

In order to reduce this problem it has been proposed to individually quick freeze such foodstuffs using, for example a fluidized bed freezer or an immersion freezer. In the former case fluidization is carried out by blasting cold air through a container which is typically a cube of sides about 4 m long. The problem with this process is that the high velocity of cold air necessary to maintain the foodstuff in fluidized form can cause severe dehydration losses. Furthermore, the very nature of the process encourages the deposition of the foodstuff in every nook and crevice of the freezer, thereby necessitating extremely time consuming steam cleaning.

Whilst the dehydration losses associated with fluidized bed freezing are largely overcome by the immersion freezer, where products are directly immersed in liquid nitrogen, immersion-freezing is only truly economic for high value delicate products, for example raspberries, because of the relatively high liquid nitrogen consumption.

U.K. Patent Specification No. 1,088,126 discloses a freezer which comprises a cooling tunnel for, precooling foodstuff, and a freezing tunnel which has (1) a product immersion section in which precooled foodstuff from said cooling tunnel can be immersed in a liquid cryogen, (2) an equalization section in which foodstuff which has been immersed in said liquid cryogen can be maintained in contact with vapour from said liquid cryogen; and (3) means to convey said foodstuff from said liquid cryogen and through said equalization section.

The means to convey the foodstuff from the liquid cryogen through the equalization section comprises a paddle wheel. It will be noted that, with the exception of the central pivot shaft, every part of the paddle wheel alternately passes through cold liquid nitrogen and then through the vapour thereabove. This constant movement promotes vaporization of the liquid nitrogen. In addition, successful operation depends on a steady feed.

The present invention is characterized in that the means to carry the liquid cryogen through the equalization section comprises a ribbon auger which, in use, lifts the foodstuff out of the liquid cryogen and conveys it through the equalization section. This characterizing feature gives, at least in preferred embodiments, two significant advantages over U.K. Patent Specification No. 1,088,126. Firstly, only a very small portion of the auger alternately passes through the cold liquid cryogen and then through the vapour thereavobe. Furthermore, the action of the ribbon auger turning does not disturb the surface of the liquid cryogen as violently as the paddle wheel. This results in lower unnecessary vaporization. Secondly, if an excess of foodstuff is delivered from the cooling section it will simply remain in the liquid cryogen until such time as it can be removed by the ribbon auger.

The ribbon auger preferably comprises a portion having a relatively large pitch and a portion having a relatively small pitch, the arrangement being such that, in use, foodstuff is moved relatively rapidly out of said liquid cryogen and transported relatively slowly through said equalisation section. In order to expedite the removal of foodstuff from the liquid cryogen the portion of the ribbon auger which, in use, rotates in liquid nitrogen, preferably comprises two starts.

In order to inhibit foodstuff becoming trapped in the freezing tunnel the tail end of the ribbon auger is preferably provided with a baffle plate which extends substantially across the entire diameter of the freezing tunnel.

The longitudinal axis of the ribbon auger is preferably inclined at between 10° and 30° from horizontal with 20° to 25° being preferred.

In order to facilitate cleaning, the freezing tunnel is preferably pivotally mounted and means are provided for pivoting the freezing tunnel from a horizontal to an inclined position.

The freezer preferably comprises a duct to transport gaseous cryogen from the freezing tunnel to the cooling tunnel. Preferably, one or more flow control fans are mounted in said duct to control the flow of gaseous cryogen therethrough.

The present invention also provides a freezing runnel for use in a freezer, said freezing tunnel having (1) a product immersion section in which precooled foodstuff from said cooling tunnel can be immersed in a liquid cryogen, (2) an equalization section in which foodstuff which has been immersed in said liquid cryogen can be maintained in contact with vapour from said liquid cryogen; and (3) means to convey said foodstuff from said liquid cryogen and through said equalization section, characterized in that said means comprises a ribbon auger.

Freezers and freezing tunnels in accordance with the present invention are preferably provided with an apparatus for maintaining the level of liquid cryogen in the freezing tunnel substantially constant. Such apparatus comprises an upwardly extending insulated tube, the upper end of which is provided with means to vent vaporized liquid cryogen and the lower end of which is connected to the freezing tunnel below the intended level of liquid cryogen therein; means for detecting the level of liquid cryogen in said insulated tube, and means to control the flow of liquid cryogen to said freezing tunnel in response to the level of liquid cryogen in said insulated tube.

If desired, the apparatus may be provided with means to restrict the flowrate of liquid cryogen to the insulated tube thereby, in use, further damping transient variations in the level of liquid cryogen in the container.

For a better understanding of the invention and to show how the same may be carried into effect reference will now be made, by way of example, to the accompanying drawings, in which:

FIG. 3 is a section showing the ribbon auger of FIG. 2 in position in a freezing tunnel forming part of the freezer shown in FIG. 1; and FIG. 4 is a schematic side elevation of an apparatus for maintaining the level of liquid nitrogen in the freezing tunnel substantially constant.

Figure 1:
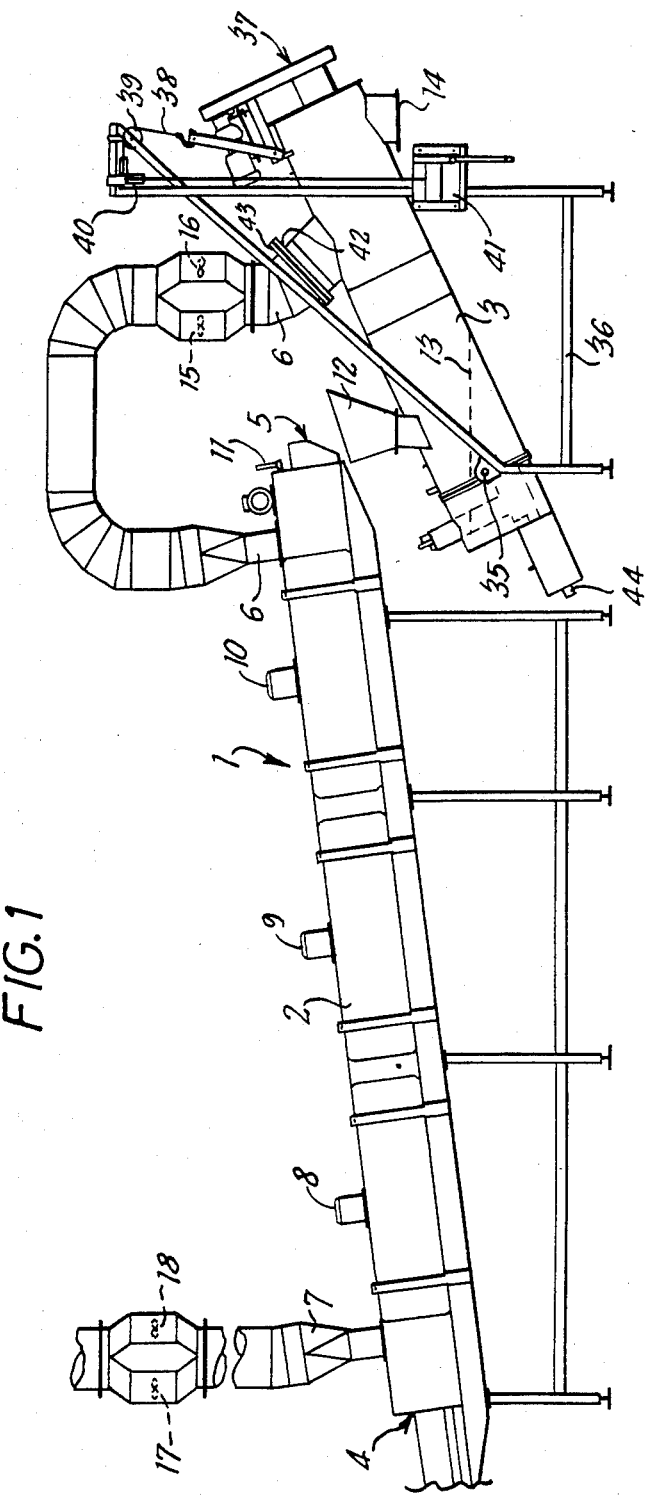
FIG. 1 is a side elevation of a freezer in accordance with the present invention.

Referring to FIG. 1 of the drawings there is shown a freezer which is generally identified by reference numeral 1. The freezer 1, which is designed for individually quick freezing shrimps, comprises a cooling tunnel 2 and a freezing tunnel 3.

The cooling tunnel 2 is of rectangular cross-section and is provided with a fine mesh conveyor belt (not shown) which transports the shrimps from the inlet 4 of the cooling tunnel 2 to the outlet 5. As the shrimps move along the cooling tunnel 2 they are cooled by cool gaseous nitrogen which enters the cooling tunnel 2 through duct 6 at about −50° C. and leaves through exhaust duct 7. Heat exchange between tthe cool gaseous nitrogen and the shrimps is facilitated by fans 8, 9 and 10, which are set in the roof of the cooling tunnel 2.

A liquid nitrogen spray bar 11 is mounted adjacent the outlet 5 of the cooling tunnel 2 and is arranged to inject liquid nitrogen into the cooling nitrogen from duct 6 will not suffice.

The shrimps arrive at the outlet 5 of the cooling tunnel 2 at 0° C., which is slightly above their freezing point because of their saline content. They then drop through a hopper 12 into a pool of liquid nitrogen the level of which is indicated by dotted line 13.

As the shrimps hit the liquid nitrogen they are surrounded by a thin barrier of evaporating nitrogen which ensures that each shrimp is individually frozen. Whilst the liquid nitrogen could be used to freeze the shrimps throughout this is wasteful of liquid nitrogen. We believe that the liquid nitrogen should be used to freeze just a thin outer layer of the foodstuff and the remainder of the cooling be continued in cold gaseous nitrogen. Accordingly, we provide means which are hereinafter described which withdraw the shrimps from the liquid nitrogen and carry them through the freezing tunnel 3 in contact with the cold nitrogen vapour which evaporates from the liquid. The frozen shrimps leave the freezing tunnel 3 through outlet 14 whilst the cold nitrogen vapour is withdrawn through duct 6 by a pair of fans 15 and 16.

In steady state operation the level of liquid nitrogen in freezing tunnel 3 is maintained substantially constant and the speed of fans 15 and 16 is adjusted so that nitrogen vapour does not pour out of hopper 12. The speed of fans 17 and 18 in exhaust duct 7 are then adjusted to ensure that the cool nitrogen from duct 6 passes through the cooling tunnel 2 together with any additional nitrogen vapour from liquid nitrogen spray bay 11.

Figure 2:
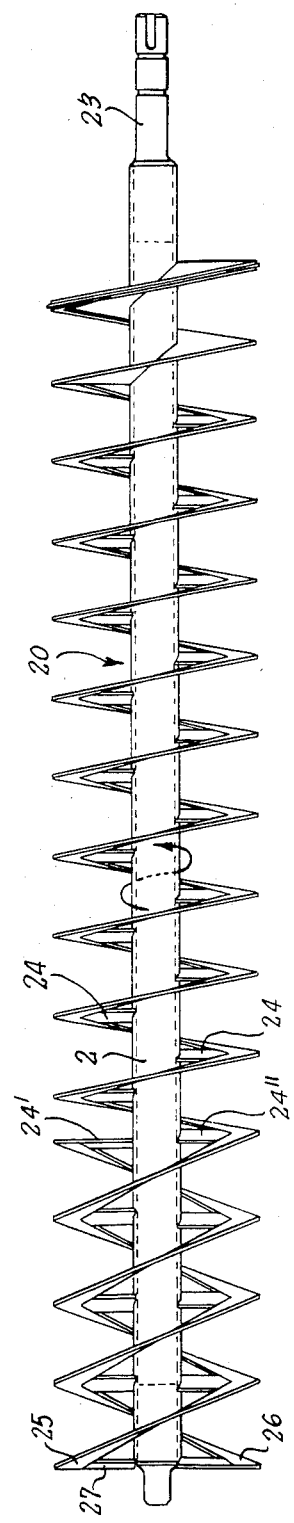
FIG. 2 is a side elevation of a ribbon auger which forms part of the freezer shown in FIG. 1.

Referring to FIG. 2, the means for withdrawing the shrimps from the liquid nitrogen comprises a ribbon auger which is generally identified by reference numeral 20. The ribbon auger 20 comprises a mandrel 21 having a tail end shaft 22 and a drive shaft 23.

A plurality of stays 24 are mounted on the mandrel 21 and support a first flight 25 and a second flight 26. The flight 25 extends from a baffle plate 27 to stay 24' at 300 mm pitch. The flight 26 extends from baffle plate 27 to flight 24" at 300 mm pitch and continues at 150 mm pitch to the end of the flight 26. It will be seen that the flight 26 is solid adjacent drive shaft 23 and, as will be seen later, acts as a nitrogen barrier.

The positioning of the ribbon auger 20 in the freezing tunnel 3 can be seen in FIG. 3. As the shrimps drop into the liquid nitrogen through hopper 12 they are lifted by the flights on the ribbon auger 20 which is rotated by a variable speed motor 127.

The baffle plate 27 prevents the shrimps entering a pocket 28 formed between the baffle plate 27 and the rear wall 29 of a heavily insulated cylindrical chamber 30 which houses the ribbon auger 20.

It will be appreciated that the flights 25 and 26, both by their pitch and number, remove the shrimps from the liquid nitrogen relatively rapidly whilst the smaller pitch section of the ribbon auger 20 moves the shrimps relatively slowly through the remainder of the freezing tunnel 3 to the outlet 14. The solid flights adjacent drive shaft 23 considerably restrict the flow of gaseous nitrogen through the outlet 14 although further economies may be made by fixing a rotary valve (not shown) to the outlet 14.

The ribbon auger 20 is supported by a tail end bearing 31 and by a bearing 32 in end cover 33 which is secured to the cylindrical chamber 30 by releasable fastenings 34.

It will be appreciated that the width of the flights together with the angle of inclination of the freezing tunnel 3 determine the thickness of the layer of shrimps which moves up the freezing tunnel 3 towards the outlet thereof. Should a sudden excess of shrimps enter the hopper 12 the shrimps will simply stay in the liquid nitrogen a little longer than intended as the excess shrimp will roll back over the tops of the flights until sufficient space is available.

As the flights 25 and 26 rotate they agitate the liquid nitrogen and improve the heat transfer from the liquid nitrogen to the shrimps. At the same time, flight 24 above the liquid nitrogen reduces the flow of gaseous nitrogen through the freezing tunnel 3 which is a most desirable effect.

The product temperature is controlled by adjusting the rotational speed of the ribbon auger 20.

Referring to FIG. 1, it will be seen that the freezing tunnel is provided with trunions 35 which are journaled in bearings on frame 36. The outlet end 37 of the freezing tunnel 3 is connected to a cable 38 which passes over pulleys 39 and 40 and is secured to a winch 41.

For the purposes of cleaning, the freezing tunnel 3 is lowered into the horizontal position by winch 41. Releasable fastenings 34 are then removed and the end cover 33 and ribbon auger 20 are withdrawn for steam cleaning. The freezing tunnel 3 is then inclined sufficiently such that as the chamber 30 is steam cleaned the waste passes through outlet line 42, valve 43 and pipe 44.

Once steam cleaning is completed valve 43 is closed and the outlet end 37 of the freezing tunnel 3 is raised until the male end 43 of duct 6 enters a diaphragm seal mounted in flange 43. At this point a safety bar (not shown) is placed beneath the outlet end 37 of the freezing tunnel 3 and the winch 41 is slackened off.

In the embodiment shown the shrimps enter the cooling tunnel 2 as small discrete items. In the case of chicken it would be possible to cook and strip the chicken and then dice the chicken meat before introducing it into the cooling tunnel 2. We have, however, found that a much more satisfactory solution is to cook and strip the chicken and then dice it after it has been through the cooling tunnel 2 but before it enters the freezing tunnel 3. In this connection we have found it most advantageous to cool the chicken to its freezing point before dicing.

It will be appreciated that the products to be frozen must have reasonable mechanical strength and it is unlikely that the freezer shown would be suitable for such delicate produce as raspberries without modification to ensure that the raspberries were introduced into the liquid nitrogen without first hitting a flight 25 or 26.

Whilst the freezer described is primarily intended for freezing foodstuffs it should be appreciated that it is also capable of freezing other materials.

Turning now to another aspect, it will be noted that the level of liquid nitrogen in the freeing tunnel 3 is kept substantially constant.

Heretofore, maintaining the level of liquid nitrogen in any type of freezer has been particularly difficult due to the bubbling and boiling which occurs at the surface of the liquid nitrogen. Previous solutions to this problem have involved the use of ultrasonic sensors to detect the level in the freezer and to increase or decrease the supply of liquid nitrogen as desired. We have found a far simpler solution. In particular, liquid nitrogen is introduced through a pipe 100 into the pocket 28 between the baffle plate 27 and a removable plate 29 which extends over substantially the entire cross-sectional area of the cylindrical chamber 30. Part of this liquid is transferred through small slots 101 in plate 21 into a tube 102 which is provided with a vent tube 103 connected to atmosphere. In use, transient disturbances caused by product entering the freezing tunnel 3 cause minimal changes in the level in tube 102 which accurately reflects the average liquid level in the vicinity of the ribbon auger 20. It will, of course, be noted that tube 102 is heavily insulated to reduce disturbances which would otherwise be caused by rapid evaporation of the liquid nitrogen in the tube 102.

As shown in FIG. 4, the tube 102 contains a level sensing device which is generally identified by reference numeral 104. The device 104 comprises a cone 105 to which is pivotally attached a float 106. As the liquid level in tube 102 changes the float 106 rises and falls and this movement is reflected by corresponding movement of a magnet inside cone 105. As the magnet moves so compressed air supplied from line 107 at about 1.5 bore gauge is directed either through vent 108 or through line 109 to one side of a diaphragm valve 110 which is biased to its closed position by spring 111. Thus, if the liquid level in tube 102 rises the float 106 rises and the magnet moves to direct more compressed air through vent 108. This reduces the pressure in line 109 and the diaphragm valve 110 tends to close under the influence of spring 111. If the liquid level in tube 102 falls the float 106 falls and the magnet moves to restrict the flow of compressed air through vent 108. This increases the pressure in line 109 and forces the valve open against the pressure of spring 111.

We claim:

1. A freezer which comprises a cooling tunnel for precooling foodstuff, and a freezing tunnel which has (1) a product immersion section in which precooled foodstuff from said cooling tunnel can be immersed in a liquid cryogen, (2) an equalization section in which foodstuff which has been immersed in said liquid cryogen can be maintained in contact with vapour from said liquid cryogen; and (3) means to convey said foodstuff from said liquid cryogen and through said equalization section, characterized in that said means comprises a ribbon auger which, in use, lifts the foodstuff out of the liquid nitrogen and conveys it through the equalization section wherein the ribbon auger comprises a portion having a relatively large pitch and a portion having a relatively small pitch, the arrangement being such that, in use, foodstuff is moved relatively rapidly out of said liquid cryogen and transported relatively slowly through said equalization section said portion of the ribbon auger which, in use, rotates in liquid nitrogen, comprises two flights.

2. A freezer as claimed in claim 1, wherein the tail end of the ribbon auger is provided with a baffle plate which extends substantially across the entire diameter of the freezing tunnel.

3. A freezer as claimed in claim 1, wherein the longitudinal axis of the ribbon auger is inclined at between 10° and 30° from horizontal.

4. A freezer as claimed in claim 3, wherein said ribbon auger is inclined at between 20° and 25° from horizontal.

5. A freezer as claimed in claim 1, wherein the freezing tunnel is pivotally mounted and means are provided for pivoting the freezing tunnel from a horizontal to an inclined position.

6. A freezer as claimed in claim 1, and further comprising a duct to transport gaseous cryogen from the freezing tunnel to the cooling tunnel.

7. A freezer as claimed in claim 6, including one or more flow control fans to control the flow of gaseous cryogen through said duct.

8. A freezer as claimed in claim 1, including an apparatus for maintaining the level of liquid cryogen in said freezing tunnel substantially constant, which apparatus comprises an upwardly extending insulated tube, the upper end of which is provided with means to vent vaporized liquid cryogen and the lower end of which is connected to the freezing tunnel below the intended level of liquid cryogen therein; means for detecting the level of liquid cryogen in said insulated tube, and means to control the flow of liquid cryogen to said freezing tunnel in response to the level of liquid cryogen in said insulated tube.

9. A freezer as claimed in claim 8, including means to restrict the flowrate of liquid cryogen to the insulated tube thereby, in use, further damping transient variations in the level of liquid cryogen in the freezing tunnel.

10. A freezing tunnel for use in a freezer said freezing tunnel having (1) a product immersion section in which precooled foodstuff from said cooling tunnel can be immersed in a liquid cryogen, (2) an equalization section in which foodstuff which has been immersed in said liquid cryogen can be maintained in contact with vapour from said liquid cryogen; and (3) means to convey said foodstuff from said liquid cryogen and through said equalization section, characterized in that said means comprises a ribbon auger wherein the ribbon auger comprises a portion having a relatively large pitch and a portion having a relatively small pitch, the arrangement being such that, in use, foodstuff is moved relatively rapidly out of said liquid cryogen and transported relatively slowly through said equalization section said portion of the ribbon auger which, in use, rotates in liquid nitrogen, comprises two flights.

11. A freezing tunnel as claimed in claim 10, including an apparatus for maintaining the level of liquid cryogen in said freezing tunnel substantially constant, which apparatus comprises an upwardly extending insulated tube, the upper end of which is provided with means to vent vaporized liquid cryogen and the lower end of which is connected to the freezing tunnel below the intended level of liquid cryogen therein; means for detecting the level of liquid cryogen in said insulated tube, and means to conrol the flow of liquid cryogen to said freezing tunnel in response to the level of liquid cryogen in said insulated tube.

12. A freezing tunnel as claimed in claim 11, including means to restrict the flowrate of liquid cryogen to the insulated tube thereby, in use, further damping transient variations in the level of liquid cryogen in the freezing tunnel.

* * * * *